US012497263B2

(12) United States Patent
Nichols et al.

(10) Patent No.: US 12,497,263 B2
(45) Date of Patent: Dec. 16, 2025

(54) ELEVATOR CALLING COORDINATION FOR ROBOTS AND INDIVIDUALS (71) Applicant: Otis Elevator Company, Farmington, CT (US)

(72) Inventors: Stephen Richard Nichols, Plantsville, CT (US); Michael P. Keenan, Jr., Suffield, CT (US); Enrico Manes, Feeding Hills, MA (US); Nicholas Cope, Brooklyn, NY (US); Yu Zhang, Shanghai (CN); Shenhong Wang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1427 days.

(21) Appl. No.: 17/100,538

(22) Filed: Nov. 20, 2020

(65) Prior Publication Data

US 2021/0284485 A1 Sep. 16, 2021

(30) Foreign Application Priority Data

Mar. 16, 2020 (CN) .......................... 202010182379.8

(51) Int. Cl.
*B66B 1/24* (2006.01)
*B66B 1/28* (2006.01)
(Continued)

(52) U.S. Cl.
CPC .............. *B66B 1/2408* (2013.01); *B66B 1/28* (2013.01); *B66B 1/468* (2013.01); *G05D 1/0225* (2013.01);
(Continued)

(58) Field of Classification Search
CPC ......... B66B 1/2408; B66B 1/28; B66B 1/468; B66B 2201/103; B66B 2201/23;
(Continued)

(56) References Cited

U.S. PATENT DOCUMENTS

2012/0041593 A1\* 2/2012 Ichinose ............... B66B 1/2458
700/258
2015/0321881 A1 11/2015 Salmikuukka et al.
(Continued)

FOREIGN PATENT DOCUMENTS

CN 105307963 A 2/2016
CN 109484932 A 3/2019
(Continued)

OTHER PUBLICATIONS

European Search Report for Application No. 20215743.4; Issued May 26, 2021; 7 Pages.
(Continued)

*Primary Examiner* — Kawing Chan
(74) *Attorney, Agent, or Firm* — CANTOR COLBURN LLP (57) ABSTRACT A method of controlling a first elevator system comprising a first elevator car is including: receiving a first elevator call from a first robot for the first elevator system to transport the first robot from a first elevator bank on a landing to a destination landing; and adjusting operation of at least one of the first robot and the first elevator system.

18 Claims, 3 Drawing Sheets (51) Int. Cl.
　　*B66B 1/46*　　　　(2006.01)
　　*G05D 1/00*　　　　(2024.01)

(52) U.S. Cl.
　　CPC ..... *B66B 2201/103* (2013.01); *B66B 2201/23* (2013.01); *B66B 2201/235* (2013.01); *B66B 2201/405* (2013.01); *B66B 2201/4615* (2013.01); *B66B 2201/4661* (2013.01)

(58) Field of Classification Search
　　CPC ........ B66B 2201/235; B66B 2201/405; B66B 2201/4615; B66B 2201/4661; G05D 1/0225
　　USPC ......................................................... 187/247
　　See application file for complete search history.

(56) References Cited

U.S. PATENT DOCUMENTS

| | | | |
|---|---|---|---|
| 2017/0291792 A1* | 10/2017 | Scoville | B66B 1/3407 |
| 2020/0180903 A1* | 6/2020 | Aberg | B66B 13/14 |
| 2022/0108245 A1* | 4/2022 | Torii | G06Q 10/06315 |

FOREIGN PATENT DOCUMENTS

| | | | |
|---|---|---|---|
| CN | 110451367 A | | 11/2019 |
| CN | 110683435 A | * | 1/2020 |
| JP | 2001171918 A | | 6/2001 |
| JP | WO2016194231 A1 | * | 6/2017 |

OTHER PUBLICATIONS

Chinese Office Action for Application No. 202010182379.8, Issued Mar. 8, 2024, 9 Pages.

* cited by examiner

ELEVATOR CALLING COORDINATION FOR ROBOTS AND INDIVIDUALS

CROSS-REFERENCE TO RELATED APPLICATIONS

This application claims the benefit of Chinese Application No. 202010182379.8 filed Mar. 16, 2020, the disclosure of which is incorporated herein by reference in its entirety.

BACKGROUND

The subject matter disclosed herein relates generally to the field of conveyance systems, and specifically to a method and apparatus for coordinating conveyance system interactions with robots.

Conveyance systems such as, for example, elevator systems, escalator systems, and moving walkways are typically only configured to carry human beings alone.

BRIEF SUMMARY

According to an embodiment, a method of controlling a first elevator system including a first elevator car is provided. The method including: receiving a first elevator call from a first robot for the first elevator system to transport the first robot from a first elevator bank on a landing to a destination landing; and adjusting operation of at least one of the first robot and the first elevator system.

In addition to one or more of the features described herein, or as an alternative, further embodiments may include: determining that the first elevator system cannot accommodate the first elevator call; instructing the first robot to move to a second elevator system including a second elevator car; and transferring the first elevator call to the second elevator system.

In addition to one or more of the features described herein, or as an alternative, further embodiments may include: determining that the first elevator system cannot accommodate the first elevator call; instructing the first robot to move to a second elevator system including a second elevator car, the second elevator system serving the landing at a second elevator bank; and transferring the first elevator call to the second elevator system.

In addition to one or more of the features described herein, or as an alternative, further embodiments may include: determining that the first elevator system cannot accommodate the first elevator call; instructing the first robot to move to a second elevator system including a second elevator car, the second elevator system being located at a second elevator bank; instructing the first robot to move to the second elevator bank via stairs or an escalator; and transferring the first elevator call to the second elevator system.

In addition to one or more of the features described herein, or as an alternative, further embodiments may include: determining that the first elevator car can accommodate the first elevator call; and instructing the first elevator car to move to the landing.

In addition to one or more of the features described herein, or as an alternative, further embodiments may include: instructing the first robot to move to the first elevator bank; and instructing the first robot to enter the first elevator car.

In addition to one or more of the features described herein, or as an alternative, further embodiments may include: receiving a second elevator call from a second robot; determining that the first elevator car can accommodate the first elevator call and the second elevator call; and instructing the first elevator car to move to the landing.

In addition to one or more of the features described herein, or as an alternative, further embodiments may include: instructing the first robot to move to the first elevator bank; instructing the second robot to move to the first elevator bank; instructing the first robot to enter the first elevator car; and instructing the second robot to enter the first elevator car.

In addition to one or more of the features described herein, or as an alternative, further embodiments may include: receiving a second elevator call from a second robot; determining that the first elevator car can accommodate the first elevator call and the second elevator call; and instructing the first elevator car to move to the landing.

In addition to one or more of the features described herein, or as an alternative, further embodiments may include: receiving a second elevator call from an individual; obtaining a robot ride-share preference for the individual; and determining that the individual cannot ride with the first robot in response to the robot ride-share preference.

In addition to one or more of the features described herein, or as an alternative, further embodiments may include: instructing the first elevator car to move to the landing to pick up the individual; and instructing the first robot not to enter the first elevator car.

In addition to one or more of the features described herein, or as an alternative, further embodiments may include: instructing the first robot to wait at the first elevator bank.

In addition to one or more of the features described herein, or as an alternative, further embodiments may include: instructing the first robot to move to a second elevator system including a second elevator car, the second elevator system serving the landing at a second elevator bank; and transferring the first elevator call to the second elevator system.

In addition to one or more of the features described herein, or as an alternative, further embodiments may include: instructing the first robot to move to a second elevator system including a second elevator car, the second elevator system being located at a second elevator bank; instructing the first robot to move to the second elevator bank via stairs or an escalator; and transferring the first elevator call to the second elevator system.

In addition to one or more of the features described herein, or as an alternative, further embodiments may include: receiving a second elevator call from an individual; obtaining a robot ride-share preference for the individual; and determining that the individual can ride with the first robot in response to the robot ride-share preference.

In addition to one or more of the features described herein, or as an alternative, further embodiments may include: instructing the first elevator car to move to the landing to pick up the individual and the first robot; determining when the individual has entered the first elevator car; and instructing the first robot to enter the first elevator car after the individual has entered the first elevator car.

In addition to one or more of the features described herein, or as an alternative, further embodiments may include that the first elevator call includes a first call code and the method further includes: receiving a second elevator call from a second robot, the second elevator call including second call code; determining that the first call code is prioritized over the second call code; and instructing the first elevator car to move to the landing and pick up the first robot.

In addition to one or more of the features described herein, or as an alternative, further embodiments may include that the first elevator call includes a first call code and the method further includes: receiving a second elevator call from an individual, the second elevator call including second call code; determining that the first call code is prioritized over the second call code; and instructing the first elevator car to move to the landing and pick up the first robot.

In addition to one or more of the features described herein, or as an alternative, further embodiments may include that the first elevator call includes a first call code and the method further includes: receiving a second elevator call from an individual, the second elevator call including second call code; determining that the second call code is prioritized over the first call code; and instructing the first elevator car to move to the landing and pick up the individual.

In addition to one or more of the features described herein, or as an alternative, further embodiments may include: receiving a second elevator call from a second robot; grouping the first elevator call with the second elevator call so that the first robot and the second robot ride together; determining that the first elevator car can accommodate the first elevator call and the second elevator call; and instructing the first elevator car to move to the landing.

In addition to one or more of the features described herein, or as an alternative, further embodiments may include that the first elevator call comprises a first call code and the method further includes: determining that the first elevator car can accommodate the first elevator call; instructing the first elevator car to move to the landing; receiving a second elevator call, the second elevator call comprising second call code; determining that the second call code is prioritized over the first call code; reassigning the first elevator car to accommodate the second elevator call code; and instructing the first robot not to enter the first elevator car if the first robot has yet to enter the first elevator car or instructing the first elevator car to let the first robot exit the first elevator car if the first robot has already entered the first elevator car.

In addition to one or more of the features described herein, or as an alternative, further embodiments may include: determining that the first elevator system cannot accommodate the first elevator call due to a high demand for the first elevator system; determining that a second elevator system can accommodate the first elevator call due to a low demand for the second elevator system; instructing the first robot to move to the second elevator system; and transferring the first elevator call to the second elevator system.

In addition to one or more of the features described herein, or as an alternative, further embodiments may include that the first robot is delivering a package to an individual at the destination landing and the method further includes: delaying a journey of the first robot to the destination landing due to a higher need elsewhere; and notifying the individual of a delay in delivery of the package via at least one of a building system manager and an online ordering platform API.

According to an embodiment, a method of controlling use of an elevator system by a robot is provided. The method including: detecting a real-time passenger flow of an elevator system using at least one of a people counter system of the robot and a people counter device, the people counter device being installed in at least one of an elevator lobby of the elevator system and an elevator car of the elevator system; and determining a future passenger flow in response to the real-time passenger flow; and adjusting use of the elevator system by the robot in response to at least one of the real-time passenger flow and the future passenger flow.

Technical effects of embodiments of the present disclosure include using coordinating use of an elevator system between robots and individuals.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
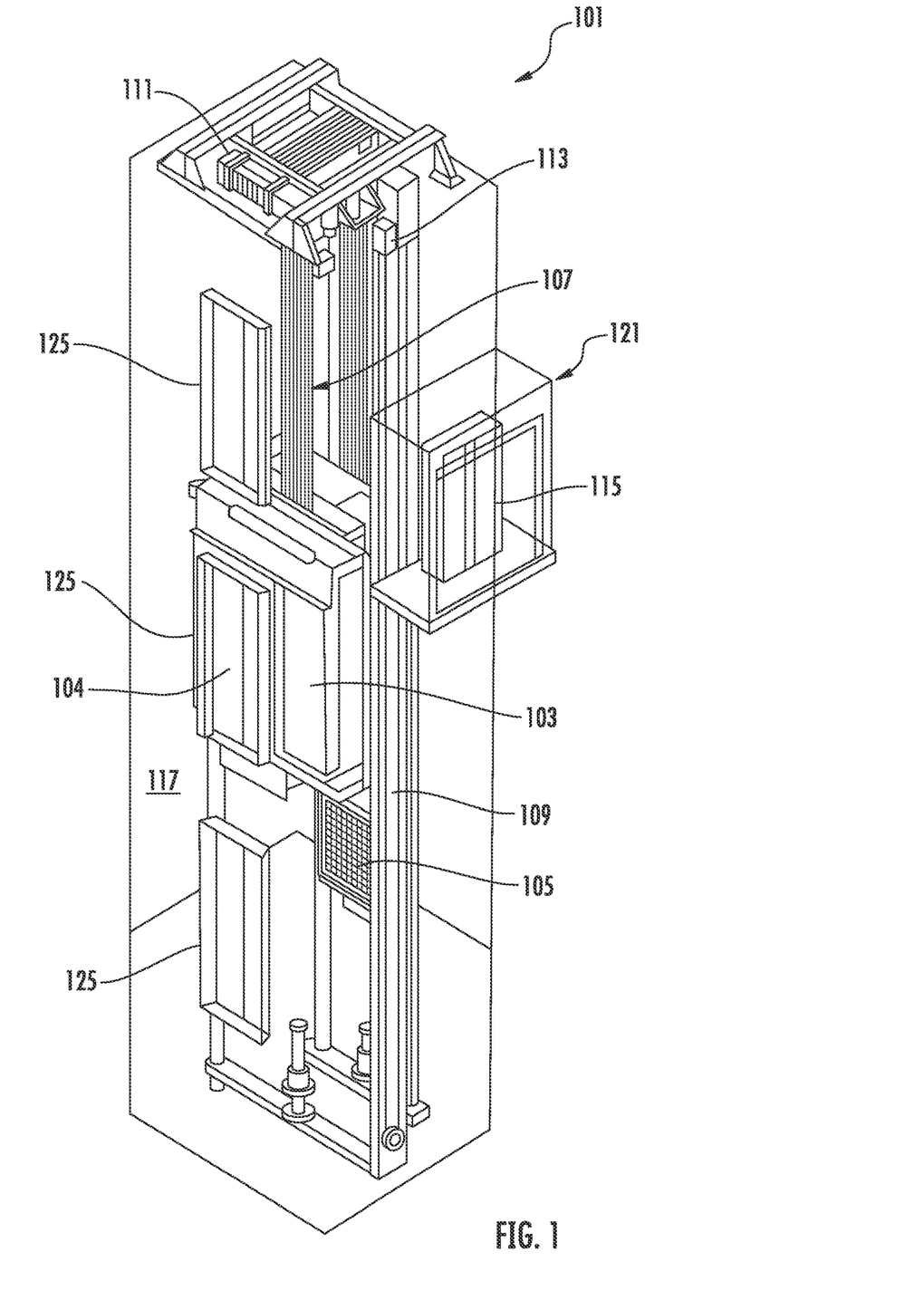
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

The elevator system 101 also includes one or more elevator doors 104. The elevator door 104 may be integrally attached to the elevator car 103 and/or the elevator door 104 may be located on a landing 125 of the elevator system 101. Embodiments disclosed herein may be applicable to both an elevator door 104 integrally attached to the elevator car 103 and/or an elevator door 104 located on a landing 125 of the elevator system 101. The elevator door 104 opens to allow passengers to enter and exit the elevator car 103.

Figure 2:
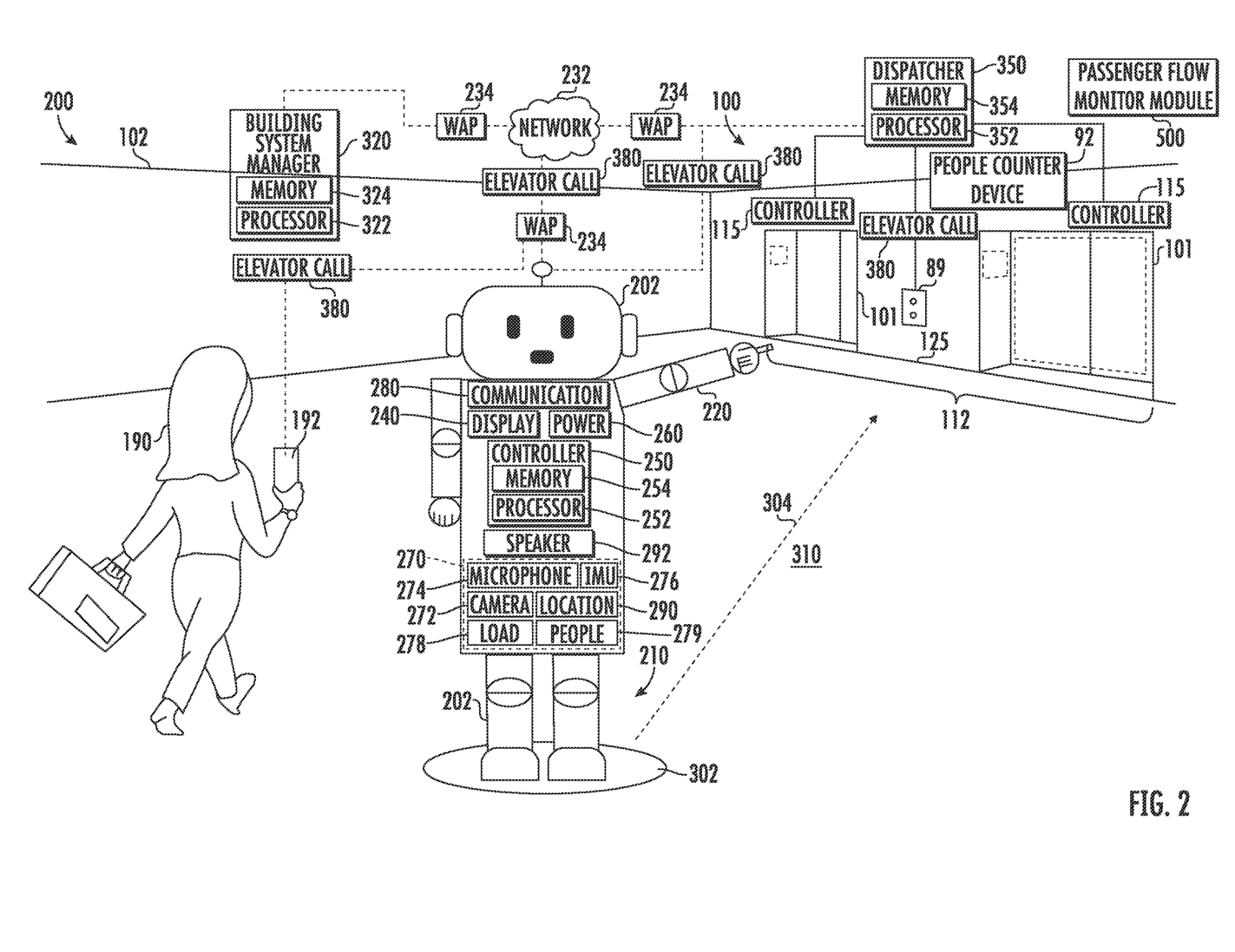
FIG. 2 illustrates a schematic view of a robot coordination system used to assist individuals, in accordance with an embodiment of the disclosure.

Referring now to FIG. 2, with continued reference to FIG. 1, a robot coordination system 200 is illustrated, in accordance with an embodiment of the present disclosure. It should be appreciated that, although particular systems are separately defined in the schematic block diagrams, each or any of the systems may be otherwise combined or separated via hardware and/or software. The robot coordination system 200 comprises and/or is in wireless communication with a robot 202. It is understood that one robot 202 is illustrated, the embodiments disclosed herein may be applicable to a robot coordination system 200 having one or more robots 202. The robot 202 may desire to utilize an elevator system 101 and the robot coordination system 200 may coordinate use of the elevator system 101 by the robot 202 and individuals 190.

It is understood that while elevator systems 101 are utilized for exemplary illustration, embodiments disclosed herein may be applied to other conveyance systems utilizing conveyance apparatuses for transportation such as, for example, escalators, moving walkways, etc.

As illustrated in FIG. 2, a building elevator system 100 within a building 102 may include multiple different individual elevator systems 101 organized in an elevator bank 112. The elevator systems 101 each include an elevator car 103 (not shown in FIG. 2 for simplicity). It is understood that while two elevator systems 101 are utilized for exemplary illustration, embodiments disclosed herein may be applied to building elevator systems 100 having one or more elevator systems 101. Further, the elevator systems 101 illustrated in FIG. 2 are organized into an elevator bank 112 for ease of explanation but it is understood that the elevator systems 101 may be organized into one or more elevator banks 112. Each of the elevator banks 112 may contain one or more elevator systems 101. Each of the elevator banks 112 may also be located on different landings 125.

The landing 125 in the building 102 of FIG. 2 may have an elevator call device 89 located proximate the elevator systems 101. The elevator call device 89 transmits an elevator call 380 to a dispatcher 350 of the building elevator system 100. It should be appreciated that, although the dispatcher 350 is separately defined in the schematic block diagrams, the dispatcher 350 may be combined via hardware and/or software in any controller 115 or other device. The elevator call 380 may include the source of the elevator call 380. The elevator call device 89 may include a destination entry option that includes the destination of the elevator call 380. The elevator call device 89 may be a push button and/or a touch screen and may be activated manually or automatically. For example, the elevator call 380 may be sent by an individual 190 or a robot 202 entering the elevator call 380 via the elevator call device 89. As illustrated in FIG. 2, the robot 202 may utilize a communication module 280 to communicate either directly to the building elevator system 100 and indirectly with the building elevator system 100 through a computing network 232.

A mobile device 192 may also be configured to transmit an elevator call 380. The robot 202 or the individual 190 may be in possession of the mobile device 192 to transmit the elevator call 380. The mobile device 192 may be a smart phone, smart watch, laptop, beacon, or any other mobile device known to one of skill in the art. The mobile device 192 be configured to transmit the elevator call 380 through computing network 232 to the dispatcher 350. The mobile device 192 may communicate to the computer network 232 through a wireless access protocol device (WAP) 234 using short-range wireless protocols, including, but not limited to, Bluetooth, Bluetooth Low Energy (BLE), Wi-Fi, HaLow (801.11ah), zWave, ZigBee, or Wireless M-Bus. Alternatively, the mobile device 192 may communicate directly with the computer network 232 using long-range wireless protocols, including, but not limited to, cellular, LTE (NB-IoT, CAT M1), LoRa, satellite, Ingenu, or SigFox.

The controllers 115 can be combined, local, remote, cloud, etc. The dispatcher 350 may be local, remote, cloud, etc. The dispatcher 350 is in communication with the controller 115 of each elevator system 101. Alternatively, there may be a single controller that is common to all of the elevator systems 101 and controls all of the elevator system 101, rather than two separate controllers 115, as illustrated in FIG. 2. The dispatcher 350 may be a 'group' software that is configured to select the best elevator car 103 to be assigned to the elevator call 380. The dispatcher 350 manages the elevator call devices 89 related to the elevator bank 112.

The dispatcher 350 is configured to control and coordinate operation of multiple elevator systems 101. The dispatcher 350 may be an electronic controller including a processor 352 and an associated memory 354 comprising computer-executable instructions that, when executed by the processor 352, cause the processor 352 to perform various operations. The processor 352 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 354 may be but is not limited to a random access memory (RAM), read only memory (ROM), FLASH, or other electronic, optical, magnetic or any other computer readable medium.

The dispatcher 350 is in communication with the elevator call devices 89 of the building elevator system 100. The dispatcher 350 is configured to receive the elevator call 380 transmitted from the elevator call device 89, the mobile device 192, and/or the robot 202. The dispatcher 350 is configured to manage the elevators calls 380 coming in from the elevator call device 89, mobile devices 192, and/or the robot 202 then command one or more elevator systems 101 to respond to elevator call 380.

The robot 202 may be configured to operate fully autonomously using a controller 250 to control operation of the robot 202. The controller 250 may be an electronic controller that includes a processor 252 and an associated memory 254 including computer-executable instructions that, when executed by the processor 252, cause the processor 252 to perform various operations. The processor 252 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 254 may be a storage device such as, for example, a random access memory (RAM), read only memory (ROM), or other electronic, optical, magnetic or any other computer readable medium.

The robot 202 includes a power source 260 configured to power the robot 202. The power source 260 may include an energy harvesting device and/or an energy storage device. In an embodiment, the energy storage device may be an onboard battery system. The battery system may include but is not limited to a lithium ion battery system. The robot 202 may be configured to move to an external power source (e.g., electrical outlet) to recharge the power source 260.

The robot 202 includes a speaker 292 configured to communicate audible words, music, and/or sounds to individuals 190 located proximate the robot 202. The robot 202 also includes a display device 240 configured to display information visually to individuals 190 located proximate the robot 202. For example, the display device 240 may be a flat screen monitor, a computer tablet, or smart phone device. In an embodiment, the display device 240 may be located on the head of the robot 202 or may replace the head of the robot 202. In an embodiment, the display device 240 a computer tablet or similar display device that is carried by the robot 202.

The robot 202 may be stationed (i.e., located) permanently or temporarily within an elevator lobby 310 that is located on the landing 125 proximate the elevator system 101. The robot 202 may include a propulsion system 210 to move the robot 202. The robot 202 may move throughout the elevator lobby 310, move away from the elevator lobby 310 throughout the landing 125, and/or may move to other landings via the elevator system 101 and/or a stair case (not shown). The propulsion system 210 may be a leg system, as illustrated in FIG. 2, that simulates human legs. As illustrated in FIG. 2, the propulsion system 210 may include two or more legs 212, which are used to move the robot 202. It is understood that while the leg system is utilized for exemplary illustration, embodiments disclosed herein may be applied to robots having other propulsion systems for transportation such as, for example, a wheel system, a rotorcraft system, a hovercraft system, a tread system, or any propulsion system may be known of skill in the art may be utilized. It is also understood that a robot 202 having a humanoid appearance is utilized for exemplary illustration, embodiments disclosed herein may be applied to robots that do not have a humanoid appearance.

The robot 202 includes a sensor system 270 to collect sensor data. The sensor system 270 may include, but is not limited, to an inertial measurement unit (IMU) sensor 276, a camera 272, a microphone 274, a location sensor system 290, a load detection system 278, and a people counter system 279. The IMU sensor 276 is configured to detect accelerations of the robot 202. The IMU sensor 276 may be a sensor such as, for example, an accelerometer, a gyroscope, or a similar sensor known to one of skill in the art. The IMU sensor 276 may detect accelerations as well as derivatives or integrals of accelerations, such as, for example, velocity, jerk, jounce, snap . . . , etc.

The camera 272 may be configured to capture images of areas surrounding the robot 202. The camera 272 may be a still image camera, a video camera, depth sensor, thermal camera, and/or any other type of imaging device known to one of skill in the art. In one embodiment, the controller 250 may be configured to analyze the images captured by the camera 272 using image recognition to identify an individual 190. In another embodiment, the controller 250 may be configured to transmit the images as raw data for processing by the building system manager 320. The image recognition may identify the individual 190 using facial recognition. When an individual 190 is identified as a specific person, then the robot 202 may transmit an elevator call 380 to the dispatcher 350. For example, the image recognition may identify the individual 190 as the CEO of the company that works on the seventh floor and then the robot 202 may transmit an elevator call 380 so that an elevator car 103 and ready to pick up the CEO when the CEO arrives at the elevator bank 112.

The microphone 274 is configured to detect sound. The microphone 274 is configured to detect audible sound proximate the robot 202, such as, for example, language spoken an individual 190 proximate the robot 202. In one embodiment, the controller 250 may be configured to analyze the sound captured by the microphone 274 using language recognition software and respond accordingly. In another embodiment, the controller 250 may be configured to transmit the sound as raw data for processing by the building system manager 320. The sound (i.e., voice) from an individual 190 may be analyzed to identify the individual 190 using voice recognition.

In one embodiment, the controller 250 may be configured to analyze the sound captured by the microphone 274 using voice recognition to identify an individual 190. In another embodiment, the controller 250 may be configured to transmit the sound as raw data for processing by the building system manager 320. When an individual 190 is identified as a specific person, then the robot 202 may transmit an elevator call 380 to the dispatcher 350. For example, the voice recognition may identify the individual 190 as the CEO of the company that works on the seventh floor and then the robot 202 may transmit an elevator call 380 so that an elevator car 103 and ready to pick up the CEO when the CEO arrives at the elevator bank 112.

Each individual 190 may have their own robot ride-share preference. For example, some individuals 190 may not like to ride in an elevator car 103 with a robot 202, whereas other individuals 190 may not mind. The individual 190 may include a robot ride-share preference when they send the elevator call 380 from the mobile device 192 or the elevator call device 89. Additionally, the individual 190 may identify their ride share preference in advance and these robot ride-share preferences may be stored in at least one of the building system manager 320 and the dispatcher 350 in a robot ride-share preference list. The dispatcher 350 may consult the robot ride-share preference list prior to calling an elevator car 103 to answer an elevator call 380 received from an individual 190 and an elevator call 380 received from a robot 202. For example, a robot 202 may not be assigned to an elevator car 103 with an individual 190 who prefers not to ride in the elevator car 103 with robots 202. The individuals may be identified through visual recognition, voice recognition, and/or user identification data enclosed with the elevator call 380 and their robot ride-share preference looked up by the dispatcher 350.

Alternatively, the dispatcher 350 may coordinate one or more robots 202 to all ride together in a single elevator car 103 to avoid interaction with individuals 190 (e.g., all robot cars). For example a first elevator call 380 may be received from a first robot 202 and a second elevator call 380 may be received from a second robot 202, then the dispatcher 350 may group the first elevator call 380 with the second elevator call 380 so that the first robot 202 and the second robot 202 ride together. The dispatcher 350 may cancel elevator calls 380 received from robots 202 and/or instruct the robot 202 to wait if the traffic from individuals 190 is high at a given time. The dispatcher 350 may instruct the robot 202 to take the stairs or an escalator if the robot is capable of doing so. The dispatcher 350 may instruct the robot 202 to move to another elevator bank if one particular elevator bank is busy.

The robot 202 may utilize a load carrying mechanism 220 to delivery items. In FIG. 2, the load carrying mechanism are arms of the robot 202. It is understood that load the arms of the robot 202 are an example and the robot 202 may utilize other load carrying mechanism, such as, for example, a pallet, a crane, a flat bed, compartment, or other load carrying mechanism known to one of skill in the art. Additionally, the robot may be utilized to pull or tow an item, such as, for example, a hospital bed or a wheel chair. In other embodiment, the robot 202 may be an autonomous hospital bed or an autonomous wheel chair. Additionally two or more robots 202 may be coordinated to work together to car a load. For example, two robots 202 may be used to carry a stretcher with an individual 190 on the stretcher.

The load detection system 278 may be configured to detect a weight of the load being carried or pushed by the load carrying mechanism 220. A robot 202 may be directed to certain elevator cars 103 based on the weight detected by the load detection system 278. For example, a robot 202 carrying an excessively heavy load may be directed to ride a freight elevator that is configured to handle excess load. Additionally, if the load being carried by two robots 202 exceeds the weight limits of an elevator car 103, the robots 202 may be instructed to ride separately. Additionally the operations of two robots 202 may be coordinated to accommodate a load of a specific weight. For example, a weight of a load may be detected by a first robot 202 and if that weight is greater than a selected weight (e.g., maximum weight) then a second robot 202 may be called to help carry the load.

Each elevator call 380 transmitted by a robot 202 may include a call code that may indicate the type of elevator call 380 including the item being transported by the robot 202 and/or the urgency of the elevator call 380. In one example, the call code may indicate that the robot 202 is transporting laundry, which may not be considered urgent. In another example, the call code may indicate that the robot 202 is transporting transplant organs, hot food, medical supplies, food, cleaning supplies, packages, mail, or any other package that may be considered urgent. When the dispatcher 350 receives the elevator call 380 the dispatcher 350 will analyze the code and determine its urgency in comparison to other elevator calls 380 received. Elevator calls 380 that are most urgent will be assigned first, while those that are not urgent may be relegated to wait. Call codes may also be included and/or applied to elevator calls 380 received from individuals. In one example, each elevator call 380 transmitted may receive the same call code, meaning that the every elevator call 380 from an individual 190 would be treated with the same priority and a robot 202 that has an urgent call code may take higher priority than the call code of the individuals 190 whereas a robot 202 with a non-urgent call code may take a lower priority than the call code of the individuals 190. In another example, different individuals 190 may be assigned a different call codes based on either a VIP status or based on job roles. Further, an emergency room physicians may have a call code that gives them the highest priorities over other call codes. In one example, residents of a building 102 may pay an extra fee to increase their call codes to a higher urgency. If a delivery is delayed due to prioritization call codes or for any other reason, the individual 190 expecting the delivery may be immediately notified of the delay via the building system manager 320 or an online ordering platform API, where the individual 190 ordered the delivery.

Based on priority of call codes or just as a general rule robots 202 could take trips that require multiple stops. For example: if the robot 202 is going to twentieth floor and there is an elevator car 103 carrying individuals going from a first floor to a tenth floor, then the robot 202 could ride that and then wait for another elevator car 103 that is available to take the robot 202 from the tenth floor to the twentieth floor. Advantageously, this maximizes dispatching efficiency for individuals 202, while not worrying about robot 202 since the robots 202 are of lower priority and do not worry about a number of stops or delays. In another embodiment, the robot 202 may only piggy back in elevator cars 103 serving elevator calls 380 for individuals so as not to waste energy of the elevator system 101 on moving an elevator car 103 with only a robot 202 within the elevator car 103.

The robot 202 also includes a location sensor system 290 configured to detect a location 302 of the robot 202. The location 302 of the robot 202 may also include the location 302 of the robot 202 relative to other objects in order allow the robot 202 to navigate through hallways of a building 102 and prevent the robot 202 from bumping into objects or individuals 190. The location sensing system 290 may use one or a combination or sensing devices including but not limited to GPS, wireless signal triangulation, SONAR, RADAR, LIDAR, image recognition, or any other location detection or collision avoidance system known to one of skill in the art. The location sensor system 290 may utilize GPS in order to detect a location 302 of the robot 202. The location sensor system 290 may utilize triangulation of wireless signals within the building 102 in order to determine a location 302 of the robot 202 within a building 102. For example, the location sensor system 290 may triangulate the position of the robot 202 within a building 102 utilizing received signal strength (e.g., RSSI) of wireless signals from WAPs 234 in known locations throughout the building 102. In order to avoid colliding with objects, the location sensor system 290 may additionally use SONAR, RADAR, LIDAR, or image recognition (Convolutional Neural Networks). Upon initial deployment or a location reset, the robot 202 may perform a learn mode, such that the robot 202 may become familiar with the environment.

The location 302 of the robot 202 may also be communicated to the dispatcher 350 when the robot 202 desires to use the elevator system 101. By knowing the location 302 of the robot 202, the distance away from the elevator bank 112 (e.g., elevator system 101) along a probable path 304, and the movement speed of the robot 202, then the dispatcher 350 may call an elevator car 103 to arrive at the elevator bank 112 at or before when the robot 202 arrives at the elevator bank 112. Use of the elevator systems 101 may be limited to learnt periods of low traffic of individuals 190. The traffic patterns of individuals 190 may be learnt using the people counter system 279 or a people counter device 92 that may detect movement of individuals over a period of time to learn traffic patterns.

The robot 202 includes a communication module 280 configured to allow the controller 250 of the robot 202 to communicate with the building system manager 320 and the dispatcher 350. The communication module 280 is capable of transmitting and receiving data to and from the dispatcher 350 through a computer network 232. The computer network 232 may be a cloud computing network. The communication module 280 is capable of transmitting and receiving data to and from the building system manager 320 through the computer network 232. In another embodiment, the communication module 280 is capable of transmitting and receiving data to and from the dispatcher 350 by communicating directly with the dispatcher 350.

The communication module 280 may communicate to the computer network 232 through a wireless access protocol device (WAP) 234 using short-range wireless protocols. Alternatively, the communication module 280 may communicate directly with the computer network 232 using long-range wireless protocols.

The communication module 280 may communicate to the dispatcher 350 through a WAP 234 using short-range wireless protocols. Alternatively, the communication module 280 may communicate directly with the dispatcher 350 using short-range wireless protocols.

The building system manager 320 may communicate to the computer network 232 through a WAP 234 using short-range wireless protocols. the building system manager 320 may communicate directly with the computer network 232 using long-range wireless protocols.

The building system manager 320 is an electronic controller that includes a processor 322 and an associated memory 324 including computer-executable instructions that, when executed by the processor 322, cause the processor 322 to perform various operations. The processor 322 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 324 may be a storage device such as, for example, a random access memory (RAM), read only memory (ROM), or other electronic, optical, magnetic or any other computer readable medium.

The building system manager 320 may be configured to obtain, store, and provide to the robot 202 information that may be useful to the robot 202. The information may include a directory of the building 102 processor including images of individuals 190 that may be used for facial recognition or voice signatures of individuals 190 that may be used for voice recognition of individuals 190 to call an elevator cars 103 for the individuals 190, as described above. The information may also include directory information of people or locations within the building 102 and/or in the area surrounding the building 102. The building system manager 320 may also perform climate control within the building 102 and/or building access control for the building 102.

The people counter system 279 is configured to detect or determine a people count. The people count may be a number of individuals 190 located on a landing 125 or more specifically a number of individuals 190 located in an elevator lobby 310 on a landing 125. The people count may be an exact number of individuals 190 or an approximate number of individuals 190.

The people counter system 279 may utilize the camera 272 for people counting. The people counter system 279 may be used to determine a number of individuals 190 proximate the elevator systems 101, a number of individuals 190 within an elevator lobby 310 proximate the elevator systems 101, and/or a number of individuals 190 on their way to the elevator system 101. Individuals 190 being located proximate the elevator system 101 and/or within the elevator lobby 310 is indicative that the individuals 190 would like to board an elevator car 103 of the elevator system 101.

The people counter system 279 may utilize one or more detection mechanisms of the robot 202, such as, for example the camera 272, a depth sensing device, a radar device, a laser detection device, a mobile device (e.g., cell phone) tracker using the communication device 280, and/or any other desired device capable of sensing the presence of individuals 190. The people counter system 279 utilizes the camera 272 for visual recognition to identify individual individuals 190 and objects in elevator lobby 310. The laser detection device may detect how many passengers walk through a laser beam to determine the number of individuals 190. The thermal detection device may be an infrared or other heat sensing camera that utilizes detected temperature to identify individual individuals 190 and objects and then determine the number of individuals 190. The depth detection device may be a 2-D, 3-D or other depth/distance detecting camera that utilizes detected distance to an object and/or individuals 190 to determine the number of individuals 190. The communication device 280 may act as a mobile device tracker may determine a number of individuals 190 on a landing 125 or in elevator lobby 310 by detecting mobile device wireless signals and/or detecting how many mobile devices are utilizing a specific application on the mobile device within the building 102 on the landing 125. As may be appreciated by one of skill in the art, in addition to the stated methods, additional methods may exist to sense the number of individuals 190 and one or any combination of these methods may be used to determine the number of individuals 190 in the elevator lobby 310, on the landing 125, or on their way to the elevator system 101.

In one embodiment, the people counter system 279 is able to detect the people count through image pixel counting. The people count may compare a current image of the elevator lobby 310 to a stock image of the elevator lobby 310. For example, the people counter system 279 may utilize pixel counting by capturing a current image of the elevator lobby 310 and comparing the current image of the elevator lobby 310 to a stock image of the elevator lobby 310 that illustrates the elevator lobby 310 with zero individuals 190 present or a known number of individuals 190 present. The number of pixels that are different between the stock image of the elevator lobby 310 and the current image of the elevator lobby 310 may correlate with the people count within the elevator lobby 310. It is understood that the embodiments disclosed herein are not limited to pixel counting to determine a people count and thus a people count may be determined utilizing other method including but not limited to video analytics software. Video analytics may identify individuals 190 from stationary objections and count each person separately to determine a total number of individuals 190.

The people count may be determined using a machine learning, deep learning, and/or artificial intelligence module. The artificial intelligence module can be located in the robot 202, within the building system manager 320 or dispatcher 350. The people count may alternatively be expressed as a percentage from zero-to-one-hundred percent indicating what percentage of pixels are different between the stock image of the elevator lobby 310 and the current image of the elevator lobby 310. The people count of the elevator lobby 310 may be expressed as a scale of one-to-ten (e.g., one being empty and ten being full) indicating what percentage of pixels are different between the stock image of the elevator lobby 310 and the current image of the elevator lobby 310. The people count may be expressed as an actual or estimated number of individuals 190, which may be determined in response to the number of pixels that are different between the stock image of the elevator lobby 310 and the current image of the elevator lobby 310.

The landing 125 in the building 102 of FIG. 2 may also include a people counter device 92 that works in collaboration with the people counter system 279 of the robot 202 to determine the people count. The people counter device 92 may include one or more detection mechanisms in the elevator lobby 310, such as, for example a weight sensing device, a visual recognition device, depth sensing device, radar device, a laser detection device, mobile device (e.g., cell phone) tracking, and/or any other desired device capable of sensing the presence of individuals 190. The visual recognition device may be a camera that utilizes visual recognition to identify individual individuals 190 and objects in elevator lobby 310. The weight detection device may be a scale to sense the amount of weight in an elevator lobby 310 and then determine the number of individuals 190. The laser detection device may detect how many passengers walk through a laser beam to determine the number of individuals 190 in the elevator lobby 310. The thermal detection device may be an infrared or other heat sensing camera that utilizes detected temperature to identify individual individuals 190 and objects in the elevator lobby 310 and then determine the number of individuals 190. The depth detection device may be a 2-D, 3-D or other depth/distance detecting camera that utilizes detected distance to an object and/or individuals 190 to determine the number of passengers. The mobile device tracking may determine a number of individuals 190 on a landing 125 or in elevator lobby 310 by detecting mobile device wireless signals and/or detecting how many mobile devices are utilizing a specific application on the mobile device within the building 102 on the landing 125 or in the elevator lobby 310. As may be appreciated by one of skill in the art, in addition to the stated methods, additional methods may exist to sense the number of individuals 190 and one or any combination of these methods may be used to determine the number of individuals 190 in the elevator lobby 310 or on the landing 125.

In one embodiment, the people counter device 92 is able to detect the people count through image pixel counting. The people count may compare a current image of the elevator lobby 310 to a stock image of the elevator lobby 310. For example, the people counter device 92 may utilize pixel counting by capturing a current image of the elevator lobby 310 and comparing the current image of the elevator lobby 310 to a stock image of the elevator lobby 310 that illustrates the elevator lobby 310 with zero individuals 190 present or a known number of individuals 190 present. The number of pixels that are different between the stock image of the elevator lobby 310 and the current image of the elevator lobby 310 may correlate with the people count within the elevator lobby 310. It is understood that the embodiments disclosed herein are not limited to pixel counting to determine a people count and thus a people count may be determined utilizing other method including but not limited to video analytics software. Video analytics may identify individuals 190 from stationary objections and count each person separately to determine a total number of individuals 190.

The people count may be determined using a machine learning, deep learning, and/or artificial intelligence module. The artificial intelligence module can be located in the people counter device 92 or in a separate module in the dispatcher 350. The separate module may be able to communicate with the people counter device 92. The people count may alternatively be expressed as a percentage from zero-to-one-hundred percent indicating what percentage of pixels are different between the stock image of the elevator lobby 310 and the current image of the elevator lobby 310. The people count of the elevator lobby 310 may be expressed as a scale of one-to-ten (e.g., one being empty and ten being full) indicating what percentage of pixels are different between the stock image of the elevator lobby 310 and the current image of the elevator lobby 310. The people count may be expressed as an actual or estimated number of individuals 190, which may be determined in response to the number of pixels that are different between the stock image of the elevator lobby 310 and the current image of the elevator lobby 310.

The people count determined by at least one of people counter system 279 of the robot 202 and the people counter device 92 may be transmitted to the dispatcher 350 to adjust operation of the elevator systems 101. For example, if the people count is high meaning that there are a large number of individuals 190 then the dispatcher 350 will send more elevator cars 103 to the elevator lobby 310.

Advantageously, the robot 202 is able to move away from the elevator lobby 310 and thus may be able to detect crowds of individuals 190 in advance of the crowd of individuals 190 reaching the elevator lobby 310. The crowd of individuals 190 the dispatcher 350 may then be reported to the dispatcher 350 and the dispatcher 350 may call elevators cars 103 in advance of the crowd of individuals 190 reaching the elevator lobby 310, which advantageously saves time by helping to clear out the crowd of individuals 190 from the elevator lobby 310 faster.

The robot coordination system 200 may also include a passenger flow monitor module 500 that is in communication with at least one of the people counter device 92 and the people counter system 279. It should be appreciated that, although passenger flow monitor module 500 is separately defined in the schematic block diagrams, the dispatcher 350 may be combined via hardware and/or software in any of the controller 115, the building system manager 320, or any other device.

The passenger flow monitor module 500 is configured to monitor real-time passenger flow for each elevator system 101 using at least one of the people counter device 92 and the people counter system 279. The real-time passenger flow may be bidirectional (i.e., up and down) The passenger flow monitor module 500 may also be able to predict a future passenger flow for each elevator system based upon the real-time passenger flow. The real-time passenger or future passenger flow may depict the passenger flow as busy, moderate, or low in three non-limiting examples. The real-time passenger flow and the predicted passenger flow may be stored in the passenger flow monitor module 500 or the building system manager 320. The passenger flow monitor module 500 is configured to transmit the real-time passenger flow and the predicted passenger flow to the robot 202 and the robot is configured to adjust its use of the elevator system 101 in response to at least one of the real-time passenger flow and the predicted passenger flow. In a first example, the robot 202 may adjust its operation by taking the high-first-lower-last elevator taking policy in response to at least one of the real-time passenger flow and the predicted passenger flow. Further, usually when the passenger flow is from top to bottom, an elevator car 103 that is going up will have space to allow the robot 202 to take the elevator upward but a robot 202 desiring to go downward may have to wait. In a second example, the robot 202 may adjust its operation by taking the lower-first-higher-las elevator taking policy in response to at least one of the real-time passenger flow and the predicted passenger flow. Further, usually when the passenger flow is from bottom-to-top, an elevator car 103 that is going down will have space to allow the robot 202 to take the elevator downward but a robot 202 desiring to go upward may have to wait. Additionally, the robot 202 may also serve as a security guard for the building 102 by utilizing the people counter system 279 and/or the camera 272 to detect individuals 190 that should not be located in the building 102. In one example, the camera 272 may be utilized identify each individual 190 within the building 102 through facial recognition and if the individual 190 is not authorized to be in the building 102 or a specific section/room of the building 102 (i.e., determined to be an intruder) then the robot 202 may activate an intruder alert and/or contact the building system manager 320. The intruder alert may be an visual light display or an audible alarm of the building system manager 320. The facial recognition determination may be compared to a database images of individuals 190 authorized to be within the building 102 and/or database images of individuals 190 not authorized to be within the building 102. If the building 102 has multiple different sections or landings 125 with different security requirements then robot 202 may be configured to travel throughout the building 102 to ensure that individuals 190 are authorized to be in the section or room of the building 102. Further, if individuals 190 are detected within the building 102 at unusual times or unauthorized times, then the robot 202 may activate an intruder alert and/or contact the building system manager 320. For example, if an individual 190 is detected after the building 102 has closed then the robot 202 may activate an intruder alert and/or contact the building system manager 320.

Figure 3:
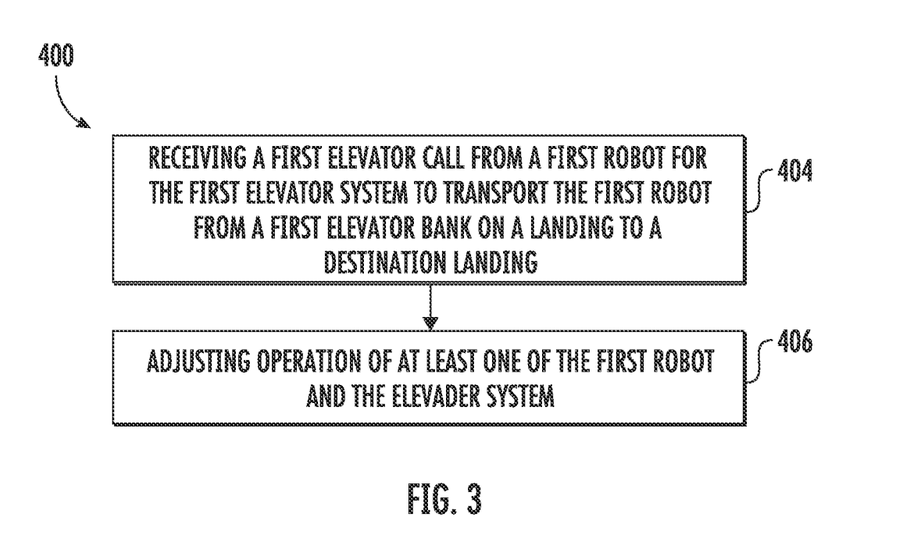
FIG. 3 is a flow chart of method of controlling a first elevator system comprising a first elevator car using a robot coordination system of FIG. 2, in accordance with an embodiment of the disclosure.

Referring now to FIG. 3, with continued reference to FIGS. 1-2, a flow chart of method 400 of controlling a first elevator system 101 comprising a first elevator car 103 is illustrated, in accordance with an embodiment of the disclosure. In an embodiment, the method 400 is performed by the robot coordination system 200 of FIG. 2.

At block 404, a first elevator call 380 is received from a first robot 202 for the first elevator system 101 to transport the first robot 202 from first elevator bank 112 on a landing 125 to a destination landing. At block 406, operation of at least one of the first robot 202 and the first elevator system 101 is adjusted. The operation of at least one of the first robot 202 and the first elevator system 101 may be adjusted in accordance with various embodiments.

In an embodiment, it may be determined that the first elevator system 101 cannot accommodate the first elevator call 380 due to a high demand (e.g., a large number of individuals 190 are using) for the first elevator system and it may be determined that a second elevator system 101 can accommodate the first elevator call 380 due to a low demand (e.g., a small number of individuals 190 are using) for the second elevator system 101. Then the first robot 202 may be instructed to move to the second elevator system 101 and the first elevator call 380 may be transferred to the second elevator system 101.

In an embodiment, it may be determined that the first elevator system 101 cannot accommodate the first elevator call 380. Then the first robot 202 is instructed to move to a second elevator system 101 comprising a second elevator car 103 and the first elevator call 380 is transferred to the second elevator system 101.

In an embodiment, it may be determined that the first elevator system 101 cannot accommodate the first elevator call 380. Then the first robot 202 is instructed to move to a second elevator system 101 comprising a second elevator car 103. The second elevator system 101 serves the landing 125 at a second elevator bank 112. The first elevator call 380 is then transferred to the second elevator system 101.

In an embodiment, it may be determined that the first elevator system 101 cannot accommodate the first elevator call 380. Then the first robot 202 is instructed to move to a second elevator system 101 comprising a second elevator car 103. The second elevator system 101 being located at a second elevator bank 112. The first robot 202 may then be instructed to move to the second elevator bank 112 via stairs or an escalator and the first elevator call 380 is transferred to the second elevator system 101.

In an embodiment, it may be determined that the first elevator car 103 can accommodate the first elevator call 380 and then the first elevator car 103 is instructed to move to the landing 125. The first robot 202 may then be instructed to move to the first elevator bank 112 and to enter the first elevator car 103.

In an embodiment, the method 400 may further comprise that a second elevator call 380 is received from a second robot 202 and it may be determined that the first elevator car 103 can accommodate the first elevator call 380 and the second elevator call 380. Then the first elevator car 103 is instructed to move to the landing 125. The first robot 202 and the second robot 202 may be instructed to move to the first elevator bank 112 and then enter the first elevator car 103.

In an embodiment, the method 400 may further comprise that a second elevator call 380 is received from a second robot 202 and it may be determined that that the first elevator car 103 can accommodate the first elevator call 380 and the second elevator call 380. Then the first elevator car 103 is instructed to move to the landing 125.

In an embodiment, the method 400 may further comprise that a second elevator call 380 is received from an individual 190 and a robot ride-share preference is obtained for the individual 190. Then it may be determined that the individual 190 cannot ride with the first robot 202 in response to the robot ride-share preference. The first elevator car 103 may then be instructed to move to the landing 125 to pick up the individual 190 and the first robot 202 is instructed not to enter the first elevator car 103. The first robot 202 may be instructed to wait at the first elevator bank 112 or move to a second elevator system 101 comprising a second elevator car 103. The second elevator system 101 serves the landing 125 at a second elevator bank 112. Alternatively, the first robot 202 may be instructed to move to the second elevator bank 112 via stairs or an escalator, if the second elevator bank 112 is not on the landing 125. The first elevator call 380 is then transferred to the second elevator system 101.

In an embodiment, the method 400 may further comprise that a second elevator call 380 is received from an individual 190 and a robot ride-share preference is obtained for the individual 190. Then it may be determined that the individual 190 can ride with the first robot 202 in response to the robot ride-share preference. The first elevator car 103 may then be instructed to move to the landing 125 to pick up the individual 190 and the first robot 202. The first robot 202 may be instructed to enter the first elevator car 103 after the individual 190 has entered the first elevator car 103.

In an embodiment, the first elevator call 380 comprises a first call code and the method 400 may further comprise that a second elevator call 380 from is received from a second robot 202. The second elevator call 380 comprising second call code. Then is may be determined that the first call code is prioritized over the second call code and the first elevator car 103 is instructed to move to the landing 125 and pick up the first robot 202.

In an embodiment, the first elevator call 380 comprises a first call code and the method 400 may further comprise that a second elevator call 380 from is received from an individual 190. The second elevator call 380 comprising second call code. Then is may be determined that the first call code is prioritized over the second call code and the first elevator car 103 is instructed to move to the landing 125 and pick up the first robot 202.

In an embodiment, the first elevator call 380 comprises a first call code and the method 400 may further comprise that a second elevator call 380 from is received from an individual 190. The second elevator call 380 comprising second call code. Then is may be determined that the second call code is prioritized over the first call code and the first elevator car 103 is instructed to move to the landing 125 and pick up the individual 190.

In an embodiment, the first robot 202 may be delivering a package to an individual 190 at the destination landing 125. The method 400 may further comprise that a journey of the first robot 202 to the destination landing 125 is delayed due to a higher need elsewhere, which may mean that the first robot 202 may be needed to perform another task of higher priority than delivering the package or a second elevator call 380 may take priority over the first elevator call 380. Once the journey is delay then the individual 190 may be notified of a delay in delivery of the package via at least one of a building system manager 320 and an online ordering platform API.

In an embodiment, the first elevator call 380 may comprises a first call code. The method 400 may further comprise that it is determined that the first elevator car 103 can accommodate the first elevator call 380, the first elevator car 103 is instructed to move to the landing 125 and then a second elevator call 3680 is received The second elevator call 380 comprising second call code. It may be determined that the second call code is prioritized over the first call code and the first elevator car 103 may be reassigned to accommodate the second elevator call code. Next, the first robot 202 may be instructed not to enter the first elevator car 103 if the first robot 202 has yet to enter the first elevator car 103 or the first elevator car 103 may be instructed to let the first robot 202 exit the first elevator car 103 if the first robot 202 has already entered the first elevator car 103.

While the above description has described the flow process of FIG. 3 in a particular order, it should be appreciated that unless otherwise specifically required in the attached claims that the ordering of the steps may be varied.

Figure 4:
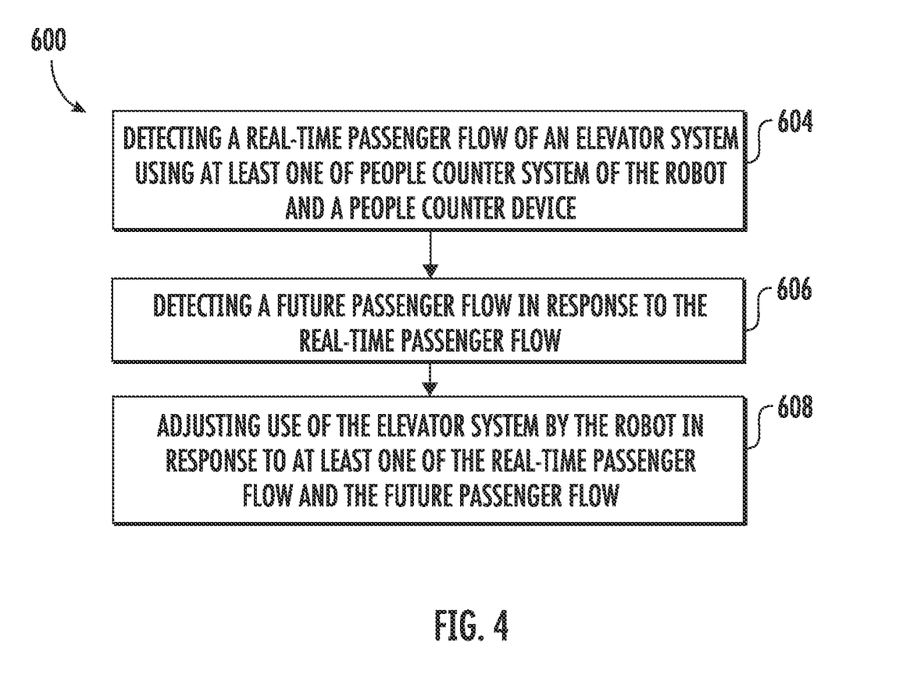
FIG. 4 is a flow chart of method of controlling use of an elevator system by a robot, in accordance with an embodiment of the disclosure.

Referring now to FIG. 4, with continued reference to FIGS. 1-2, a flow chart of method 600 of controlling use of an elevator system 101 by a robot 202, in accordance with an embodiment of the disclosure. In an embodiment, the method 400 is performed by the passenger flow monitor module 500 of FIG. 2.

At block 604, a real-time passenger flow of an elevator system 101 is detected using at least one of a people counter system 279 of the robot 202 and a people counter device 92. The people counter device 92 is installed in at least one of an elevator lobby 310 of the elevator system 101 and an elevator car 103 of the elevator system 101.

At block 606, a future passenger flow is determined in response to the real-time passenger flow.

At block 608, use of the elevator system 101 by the robot 202 is adjusted in response to at least one of the real-time passenger flow and the future passenger flow. In a first example, the robot 202 may adjust its operation by taking the high-first-lower-last elevator taking policy in response to at least one of the real-time passenger flow and the predicted passenger flow. Further, usually when the passenger flow is from top to bottom, an elevator car 103 that is going up will have space to allow the robot 202 to take the elevator upward but a robot 202 desiring to go downward may have to wait. In a second example, the robot 202 may adjust its operation by taking the lower-first-higher-las elevator taking policy in response to at least one of the real-time passenger flow and the predicted passenger flow. Further, usually when the passenger flow is from bottom-to-top, an elevator car 103 that is going down will have space to allow the robot 202 to take the elevator downward but a robot 202 desiring to go upward may have to wait.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of controlling a first elevator system comprising a first elevator car, the method comprising:
    receiving a first elevator call from a first robot for the first elevator system to transport the first robot from a first elevator bank on a landing to a destination landing; and
    adjusting operation of at least one of the first robot and the first elevator system;
    the method further comprising:
    receiving a second elevator call from an individual;
    obtaining a robot ride-share preference for the individual; and
    determining that the individual cannot ride with the first robot in response to the robot ride-share preference.

2. The method of claim 1, further comprising:
determining that the first elevator system cannot accommodate the first elevator call;
instructing the first robot to move to a second elevator system comprising a second elevator car; and
transferring the first elevator call to the second elevator system.

3. The method of claim 1, further comprising:
determining that the first elevator system cannot accommodate the first elevator call;
instructing the first robot to move to a second elevator system comprising a second elevator car, the second elevator system serving the landing at a second elevator bank; and
transferring the first elevator call to the second elevator system.

4. The method of claim 1, further comprising:
determining that the first elevator car can accommodate the first elevator call; and
instructing the first elevator car to move to the landing.

5. The method of claim 4, further comprising:
instructing the first robot to move to the first elevator bank; and
instructing the first robot to enter the first elevator car.

6. The method of claim 1, further comprising:
receiving a second elevator call from a second robot;
determining that the first elevator car can accommodate the first elevator call and the second elevator call; and
instructing the first elevator car to move to the landing.

7. The method of claim 6, further comprising:
instructing the first robot to move to the first elevator bank;
instructing the second robot to move to the first elevator bank;
instructing the first robot to enter the first elevator car; and
instructing the second robot to enter the first elevator car.

8. The method of claim 1, further comprising:
receiving a second elevator call from a second robot;
determining that the first elevator car can accommodate the first elevator call and the second elevator call; and
instructing the first elevator car to move to the landing.

9. The method of claim 1, further comprising:
instructing the first elevator car to move to the landing to pick up the individual; and
instructing the first robot not to enter the first elevator car.

10. The method of claim 9, further comprising:
instructing the first robot to wait at the first elevator bank.

11. The method of claim 9, further comprising:
instructing the first robot to move to a second elevator system comprising a second elevator car, the second elevator system serving the landing at a second elevator bank; and
transferring the first elevator call to the second elevator system.

12. The method of claim 9, further comprising:
instructing the first robot to move to a second elevator system comprising a second elevator car, the second elevator system being located at a second elevator bank;

instructing the first robot to move to the second elevator bank via stairs or an escalator; and
transferring the first elevator call to the second elevator system.

13. The method of claim 1, wherein the first elevator call comprises a first call code and the method further comprises:
receiving a second elevator call from a second robot, the second elevator call comprising second call code;
determining that the first call code is prioritized over the second call code; and
instructing the first elevator car to move to the landing and pick up the first robot.

14. The method of claim 1, wherein the first elevator call comprises a first call code and the method further comprises:
receiving a second elevator call from an individual, the second elevator call comprising second call code;
determining that the first call code is prioritized over the second call code; and
instructing the first elevator car to move to the landing and pick up the first robot.

15. The method of claim 1, wherein the first elevator call comprises a first call code and the method further comprises:
receiving a second elevator call from an individual, the second elevator call comprising second call code;
determining that the second call code is prioritized over the first call code; and
instructing the first elevator car to move to the landing and pick up the individual.

16. A method of controlling a first elevator system comprising a first elevator car, the method comprising:
receiving a first elevator call from a first robot for the first elevator system to transport the first robot from a first elevator bank on a landing to a destination landing; and
adjusting operation of at least one of the first robot and the first elevator system;
the method further comprising:
determining that the first elevator system cannot accommodate the first elevator call;
instructing the first robot to move to a second elevator system comprising a second elevator car, the second elevator system being located at a second elevator bank;
instructing the first robot to move to the second elevator bank via stairs or an escalator; and
transferring the first elevator call to the second elevator system.

17. A method of controlling a first elevator system comprising a first elevator car, the method comprising:
receiving a first elevator call from a first robot for the first elevator system to transport the first robot from a first elevator bank on a landing to a destination landing; and
adjusting operation of at least one of the first robot and the first elevator system;
the method further comprising:
receiving a second elevator call from an individual;
obtaining a robot ride-share preference for the individual; and
determining that the individual can ride with the first robot in response to the robot ride-share preference.

18. The method of claim 17, further comprising:
instructing the first elevator car to move to the landing to pick up the individual and the first robot;
determining when the individual has entered the first elevator car; and
instructing the first robot to enter the first elevator car after the individual has entered the first elevator car.

* * * * *